US006733159B1

United States Patent
Wu

(10) Patent No.: US 6,733,159 B1
(45) Date of Patent: May 11, 2004

(54) DO-IT-YOURSELF LAMP CONNECTING STRUCTURE

(76) Inventor: Wen-Chang Wu, No. 10, Lane 191, Hsi Hsin Street, Chuang Ya Tsun, Hsiu Shui Hsiang, Chang Hua Hsien (TW)

( * ) Notice: Subject to any disclaimer, the term of this patent is extended or adjusted under 35 U.S.C. 154(b) by 0 days.

(21) Appl. No.: 10/329,454

(22) Filed: Dec. 27, 2002

(51) Int. Cl.$^7$ ................................................. A47H 1/10
(52) U.S. Cl. ........................ 362/423; 362/406; 362/289; 362/372; 362/429
(58) Field of Search ................................ 362/404, 405, 362/406, 147, 403, 289, 372, 429

(56) References Cited

U.S. PATENT DOCUMENTS 6,315,439 B1 * 11/2001 Denley ........................ 362/524
6,612,531 B2 * 9/2003 Wu ............................. 248/317

* cited by examiner

Primary Examiner—Sandra O'Shaa
Assistant Examiner—Anabel Ton
(74) Attorney, Agent, or Firm—Troxell Law Office PLLC

(57) ABSTRACT

The present invention relates to a DIY lamp connecting structure applicable for all kinds of lamp, comprising a hanging frame on a switch box, and a connector at the top of the lamp; wherein said hanging frame has a pivotal base extended from the central hole on the side of the hanging frame, and the bottom of the pivotal base has a ratchet blocking wheel; a latch member is disposed at the top by a spring and the aslant plane of the lower half section of the latch member is aligned with the plane of the ratchet blocking wheel, and the plane of the utmost bottom presses against the serrations of the blocking wheel, such that the blocking wheel can only rotate in the same direction, and unable to rotate in the reverse direction. A ratchet serrated edge disposed along the side of the connector is engaged, so that the connector can be latched into the blocking wheel of the hanging frame step by step, and assure the secure coupling within the hanging frame. Such structure not only reduces the volume of the lamp for transportation and storage, but also provides a very convenient way for the users to assemble the lamp on their own by inserting the connector into the hanging frame.

4 Claims, 4 Drawing Sheets

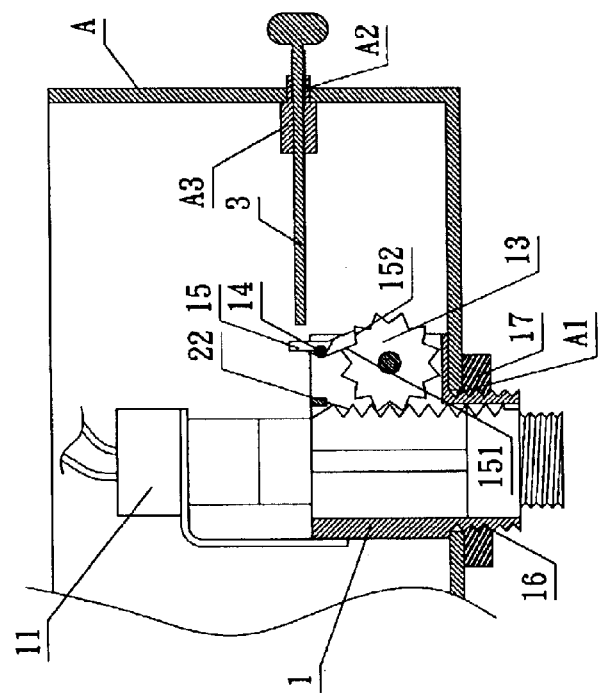
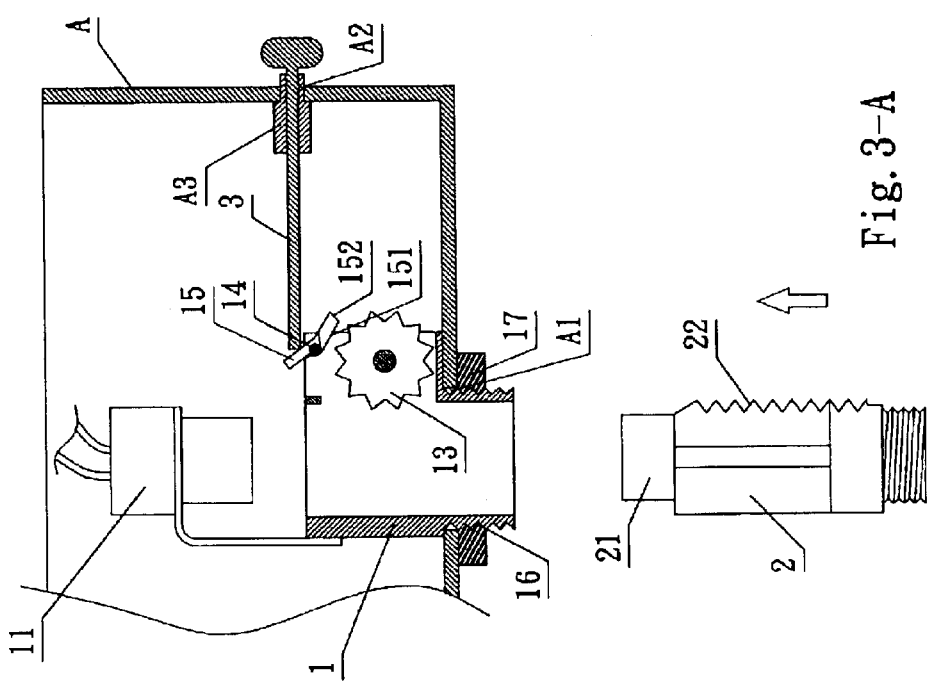
Fig. 3-A Fig. 3-B

DO-IT-YOURSELF LAMP CONNECTING STRUCTURE

BACKGROUND OF THE INVENTION

1. Field of the Invention

The present invention relates to a do-it-yourself (DIY) lamp connecting structure, comprising a hanging frame on a pivotal base that has a ratchet blocking wheel and a latch member, and the aslant plane at the lower half section of the latch member aligns with the ratchet wheel plane of the blocking wheel, such that the blocking wheel can only rotate in the same direction; a ratchet serrated edge disposed on the connector can engage the blocking wheel to assure the secure connection of the connector in the hanging frame. Such arrangement can accomplish the effect of reducing the volume of the lamp for transportation and storage, and facilitating the DIY assembling.

2. Description of the Related Art

In general, the connecting structure between a traditional lamp and its switch box uses a bolt-and-nut relation for the coupling, however this kind of assembly by screws and nuts may easily collide the finished goods during the assembling, and also requires tools such as a wrench or a screwdriver for the fixing. The friction produced during the assembling may expose the electric wire easily and even cause the hazard of electric shock. Therefore, the traditional way causes trouble to the assembling, and is definitely not suitable for DIY users to assemble the lamp by themselves. Manufacturers have to assemble the whole set of the lamp before selling it, which may increase the volume of the lamp for transportation as well as the cost. In view of these shortcomings, the inventor of the present invention based on years of experience accumulated from the engagement in the related industry conducted extensive research to resolve the aforementioned shortcomings and invented the present invention.

SUMMARY OF THE INVENTION

The primary objective of this invention is to provide a DIY lamp connecting structure, comprising a hanging frame on a switch box, and a connector at the top of the lamp; wherein said hanging frame has a pivotal base extended from the central hole of the side of the hanging frame, and the bottom of the pivotal base has a ratchet blocking wheel, and a latch member is disposed at the top by a spring and the aslant plane of the lower half section of the latch member is aligned with the plane of the ratchet blocking wheel, and the plane of the utmost bottom presses against the serrations of the blocking wheel, such that the blocking wheel can only rotate in the same direction, and unable to rotate in the reverse direction. A ratchet serrated edge disposed along the side of the connector is engaged, so that the connector can be latched into the blocking wheel of the hanging frame step by step, and assure the secure coupling within the hanging frame.

Another objective of this invention is to provide a DIY lamp connecting structure of which the lamp with the connector can be removed from the switch box in advance for the packaging, transportation, or storage of the ceiling fan/lamp in order to reduce the volume of the material for transportation and storage. After the user has bought the lamp, the user just needs to insert the connector into the switch box for the application without the need of using tools for the installing and uninstalling the bolts and nuts. Thus, the present invention accomplishes the effect of facilitating users to assemble the lamp on their own.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which:

FIG. 3A is a diagram of the assembling of a preferred embodiment of the present invention.

FIG. 3B is a diagram of the disassembling of a preferred embodiment of the present invention.

DETAILED DESCRIPTION OF THE PREFERRED EMBODIMENTS

Figure 1:
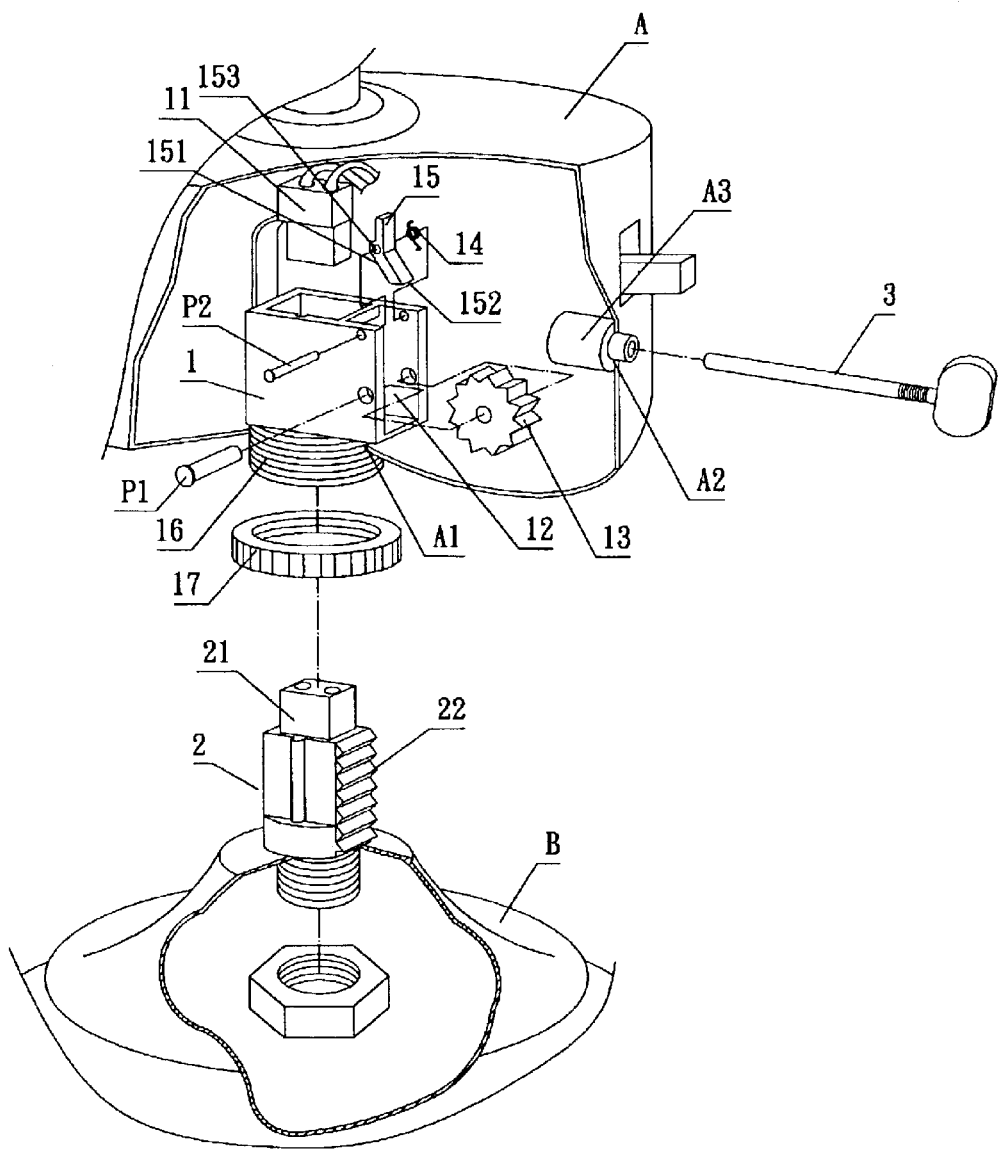
FIG. 1 is an illustrative diagram of the disassembled parts of a preferred embodiment of the present invention.

In the detailed description of the preferred embodiments, it should be noted that like elements are indicated by the same reference numerals throughout the disclosure.

Figure 2:
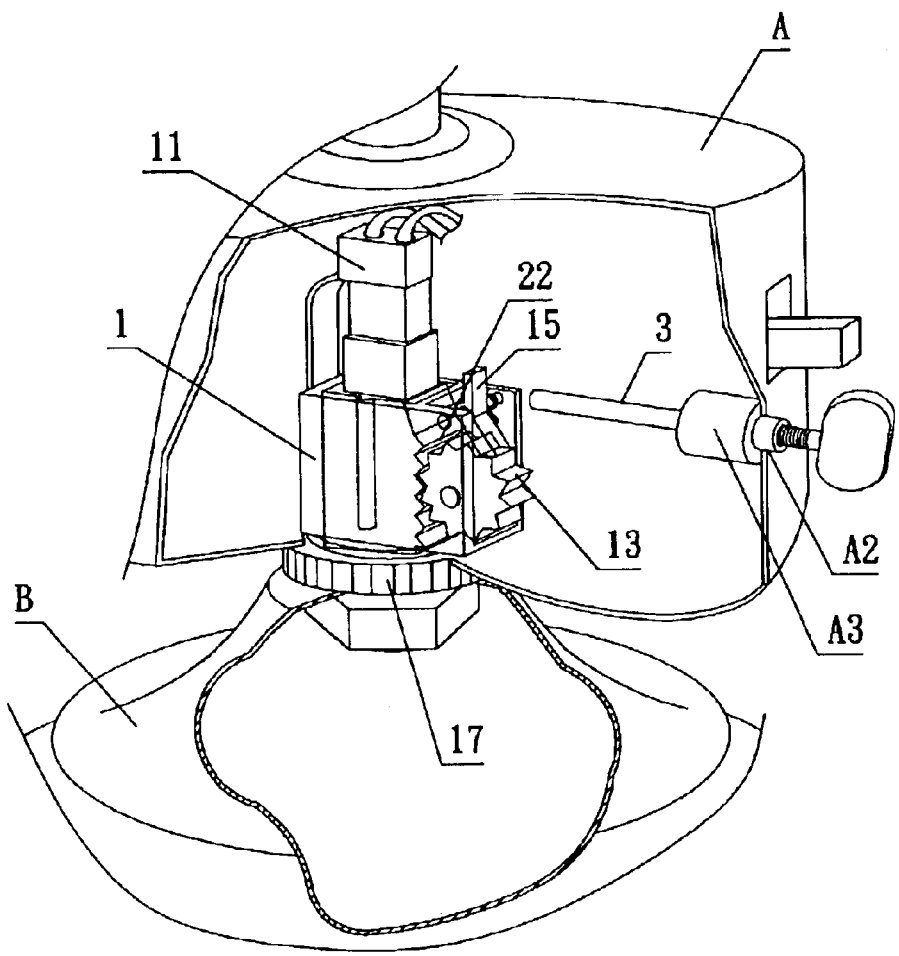
FIG. 2 is an illustrative diagram of a preferred embodiment of the present invention when the two loose leaves are pivotally coupled.

Please refer to FIG. 1 and FIG. 2 for the structure of the present invention comprising a hanging frame 1 at the center of the interior of the switch box A, and a connector 2 fixed at the center of the lamp B; wherein said switch box A at its center having a fixing hole A1 for the hanging frame 1 and a through hole A2 disposed around the periphery of the switch box, and the through hole A2 at its inner side having a conductive base A3 straightly passing through a control rod 3. A connecting socket 11 is extended upward on the side edge of the hanging frame 1, and a pivotal base 12 is extended from the central hole of the hanging frame 1. The bottom of the pivotal base 12 has a ratchet blocking wheel 13 pivotally coupled to the bottom of the pivotal base 12 with a wedge 12. A latch member 15 is pivotally disposed at the top of the pivotal base 12 by means of a wedge P2 and a spring 14, and the latch member 15 is L-shaped, and the lower half section of the aslant plane 151 is aligned with the plane of the ratchet wheel of the blocking wheel 13 such that the blocking wheel 13 can rotate in the same direction along the aslant plane 151 of the latch member, and the plane 152 at the utmost bottom of the latch member 15 presses against the ratchet serrations of the blocking wheel 13 so that the blocking wheel 13 is unable to rotate in the reverse direction. A thread section 16 is protruded from the bottom of the hanging frame 1 for mounting a screw nut 17 from the bottom of the switch box A, and the hanging frame 1 is fixed to the interior of the switch box A.

The control rod 3 passes through the through hole A2 at the outer edge of the switch box A and the conductive base A3, and when the front end of the control rod 3 is pushed forward, the control rod 3 pushes and rotate the latch member 15 at the pivotal position 153 as the pivot, so that the lower half section of the latch member 15 is pushed outward to separate the ratchet serration corresponsive to the blocking wheel 13 and rotate the blocking wheel 13 in the same/reverse direction as we wish A plug section 21 corresponsive to the central hole of the hanging frame 1 is disposed at the top of the conductive connector 2 protruding from downward from the interior of the hanging frame 1. A ratchet serrated edge 22 exactly engaged with the blocking wheel 13 is disposed at an end of the conductive connector 2 aligned with the blocking wheel 13 of the hanging frame 1.

Please refer to FIG. 3 for the movement. If the conductive connector 2 is inserted upward, the ratchet serrated edge 22 of the conductive connector first engages the blocking wheel 13 of the hanging frame 1. If the conductive connector 2 continues to push upward, the serrated edge 22 of the conductive connector 2 is pushed to the latch wheel 13 step by step, such that the blocking wheel 13 will press against and rotate the latch member 15 outward at the pivotal position 153 as the pivot, and constitute a detachment of the latch member 15 and the pressing of the blocking wheel 13 to assist the conductive connector 2 to move up continuously to latch into the interior of the hanging frame, until the connector section 21 of the conductive connector 2 is filly inserted into the socket 11. Then, the flat plane 152 at the bottom of the latch member 15 presses against the upper section of the ratchet serration of the blocking wheel 13 and causes the blocking wheel 13 unable to rotate in the reverse direction as shown in FIG. 3A to assure that the conductive connector 2 is mounted securely in the interior of the hanging frame 1.

If we want to remove the conductive connector 2 from the hanging frame 1, the control rod 3 should be pushed inward first, so that the control rod 3 aligned with the upper half section of the latch member IS can presses exactly on the pivotal position of the latch member 15 as the pivot for the rotation, and the lower half section of the latch member 15 is pushed outward to completely separate the ratchet serrations aligned with the blocking wheel 13, and allows the blocking wheel 13 to rotate in the same/reverse direction as we wish (as shown in FIG. 3B) such that the conductive connector 2 can be successfully removed from the hanging frame 1.

Figure 4:
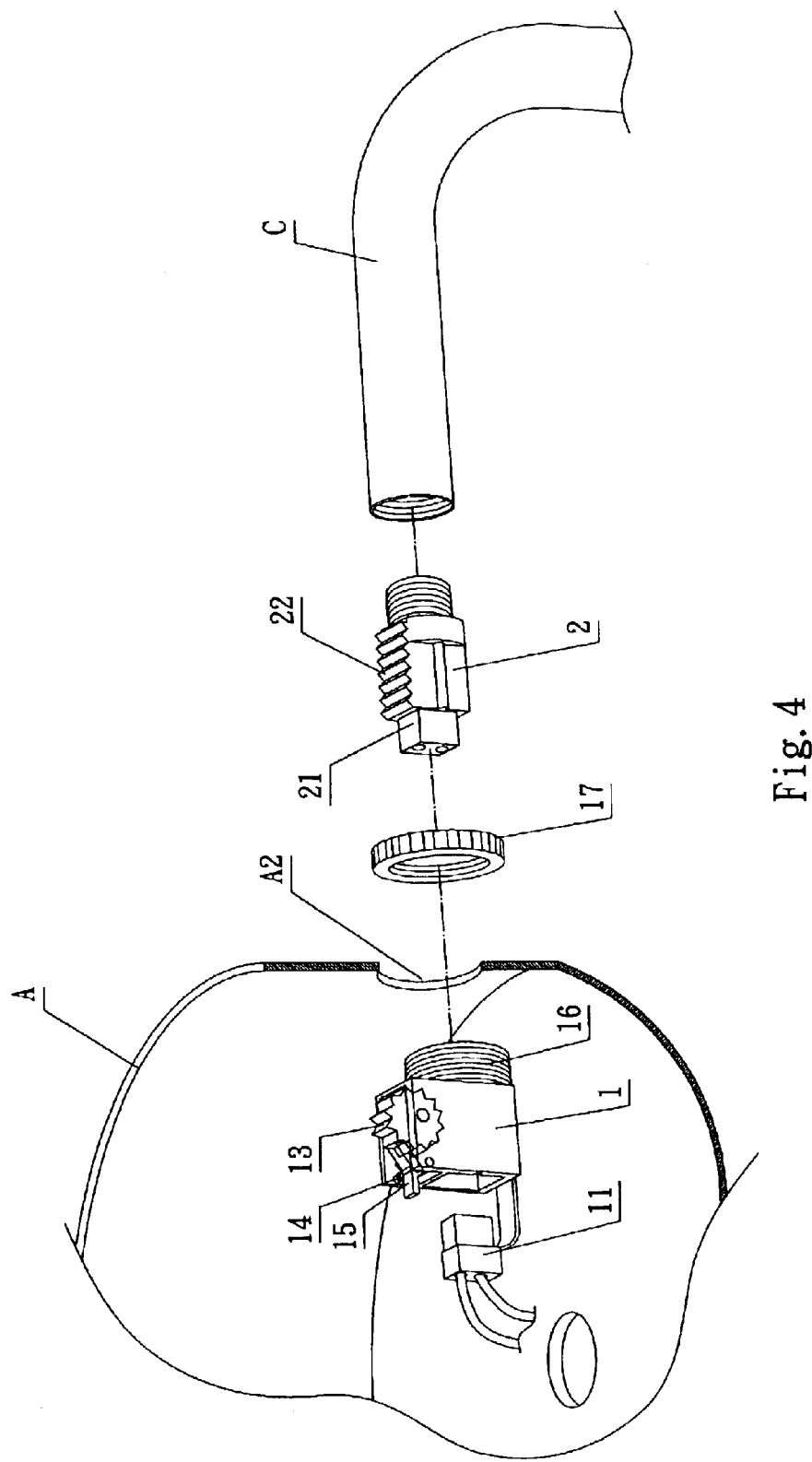
FIG. 4 is a diagram of the ceiling lamp according to a preferred embodiment of the present invention.

Please refer to FIG. 4 for the ceiling lamp according to a preferred embodiment of the present invention. In the figure, the hanging frame is installed to the lateral side of the switch box A, and the blocking wheel 13 and latch member 15 are disposed on the upper edge of the hanging frame 1 such that a ceiling lamp rod C with the connector 2 at its head section can be installed, and latched progressively into the interior of the hanging frame 1,and thus mount the ceiling lamp rod C into the side end of the switch box A.

When the ceiling lamp is packed, transported, or stored, the conductive connector 2 with the lamp B or the ceiling lamp rod C can be removed from the switch box A first to reduce the volume of the lamp for transportation and storage. Furthermore, After the user has bought the lamp, the user just needs to insert the conductive connector 2 into the hanging frame 1 inside the switch box A for the application, and thus enables users to assemble the lamp on their own.

In summation of the above description, the DIY lamp connecting structure of the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A do-it-yourself (DIY) lamp connecting structure, comprising a hanging frame inside a switch box and a conductive connector fixed on the lamp; wherein said switch box at its center having a fixing hole for mounting the hanging frame, and a through hole disposed on a lateral side of the switch box, and a conductive base disposed on the inner side of the through hole for letting a control rod pass through;

said hanging frame having a socket extended upward from the side of the hanging frame, and a pivotal base extended from the side edge of the central hole of the hanging frame;

a ratchet blocking wheel, pivotally coupled to pivotal base proximate to the bottom of the pivotal base, and a latch member pivotally coupled to the top end of the pivotal base by a spring, and the lower half section of an aslant plane of the latch member aligning with the plane of the ratchet blocking wheel, such that the blocking wheel rotating in the same direction, and the plane of the utmost bottom of the latch member pressing against the serrations of the blocking wheel so that the blocking wheel not able to rotate in the reverse direction;

said conductive connector having a connector section aligning with the central hole of the hanging frame and protruded upward from the interior of the hanging frame, and a ratchet serrated edge engaged with the blocking wheel, disposed at an end of the blocking wheel of the hanging frame aligned with the conductive connector; such arrangement accomplishes the effect of reducing the volume of the lamp for transportation and storage, and facilitating users to assemble the lamp on their own.

2. A do-it-yourself (DIY) lamp connecting structure as claimed in claim 1, wherein said control rod passing through the switch box being passed through the through hole and the conductive base from the outer edge of the switch box, and the front end of the control rod being exactly aligned with the upper half section of the latch member of the hanging frame, so that when the control rod being pushed forward, the control lord pressing against the pivotally coupling position as a pivot for the rotation and pushing the lower half section of the latch member outward to separate the ratchet serration aligned with the blocking wheel and letting the blocking wheel to rotate in the same/reverse direction.

3. A do-it-yourself (DIY) lamp connecting structure as claimed in claim 1, wherein said hanging frame having a thread section protruded from the bottom of the hanging frame for letting a screw nut be coupled to the lower section of the switch box and mounting the hanging frame into the switch box.

4. A do-it-yourself (DIY) lamp connecting structure as claimed in claim 1, wherein said hanging frame being disposed on a lateral side of the switch box, and the blocking wheel and latch member being pivotally coupled to the upper edge of the hanging frame, such that the ceiling lamp rod with a connector at the head section of the ceiling lamp rod being latched inside the hanging frame, and mounting the ceiling lamp rod to a side of the switch box.

\* \* \* \* \*